United States Patent

[11] 3,611,858

| [72] | Inventors | William C. Beatty<br>Munster;<br>Milton G. Mock, Hobart, both of Ind. |
|---|---|---|
| [21] | Appl. No. | 6,109 |
| [22] | Filed | Jan. 27, 1970 |
| [45] | Patented | Oct. 12, 1971 |
| [73] | Assignee | Beatty Machine & Manufacturing Co.<br>Hammond, Ind. |

[54] GAUGE STOP SYSTEM FOR MOVING WORK THROUGH PUNCH PRESS
11 Claims, 5 Drawing Figs.

[52] U.S. Cl. .................................................... 83/220,
83/221, 83/222, 83/262, 83/264, 83/277, 83/416,
214/1.4, 214/1.7
[51] Int. Cl. .................................................... B26d 5/20,
B65h 9/10, B65h 9/14
[50] Field of Search.......................................... 83/220,
209, 221, 222, 277, 264, 262, 416; 214/1.4, 1.7

[56]                  References Cited
               UNITED STATES PATENTS
838,292  12/1906  Wilzin .......................... 83/220 X
1,445,718  2/1923  Ross ............................ 83/220 X
1,459,776  6/1923  Lasker ......................... 83/220 X
2,448,519  9/1948  Clapp .......................... 83/220 X

*Primary Examiner*—Frank T. Yost
*Attorney*—Darbo, Robertson & Vandenburgh

ABSTRACT: A tow carriage used for drawing structural steel members, such as I-beams or angles, through a punch press automatically positions its pieces accurately at the successive positions for punching. The positions are determined by gauge bars positioned along the path of the two carriage, and successively engaged by a gauge arm on the carriage. The machine is automatically cycled to pull its steel members at full speed until a sensor on the carriage detects the approach to a gauge position, then at slow speed until the gauge bar has been passed, then at slow speed reverse until a gauge face on the gauge arm, which drops to gauging level upon passing the gauge bar, firmly engages the gauge face of the bar without wear. The reverse driving force is reduced to a holding value, and the punch operates. Then the full speed forward drive of the carriage starts a new cycle. This is repeated until the punching has been completed at the last gauge bar. The successive steps of cycling are mostly triggered by limit switches.

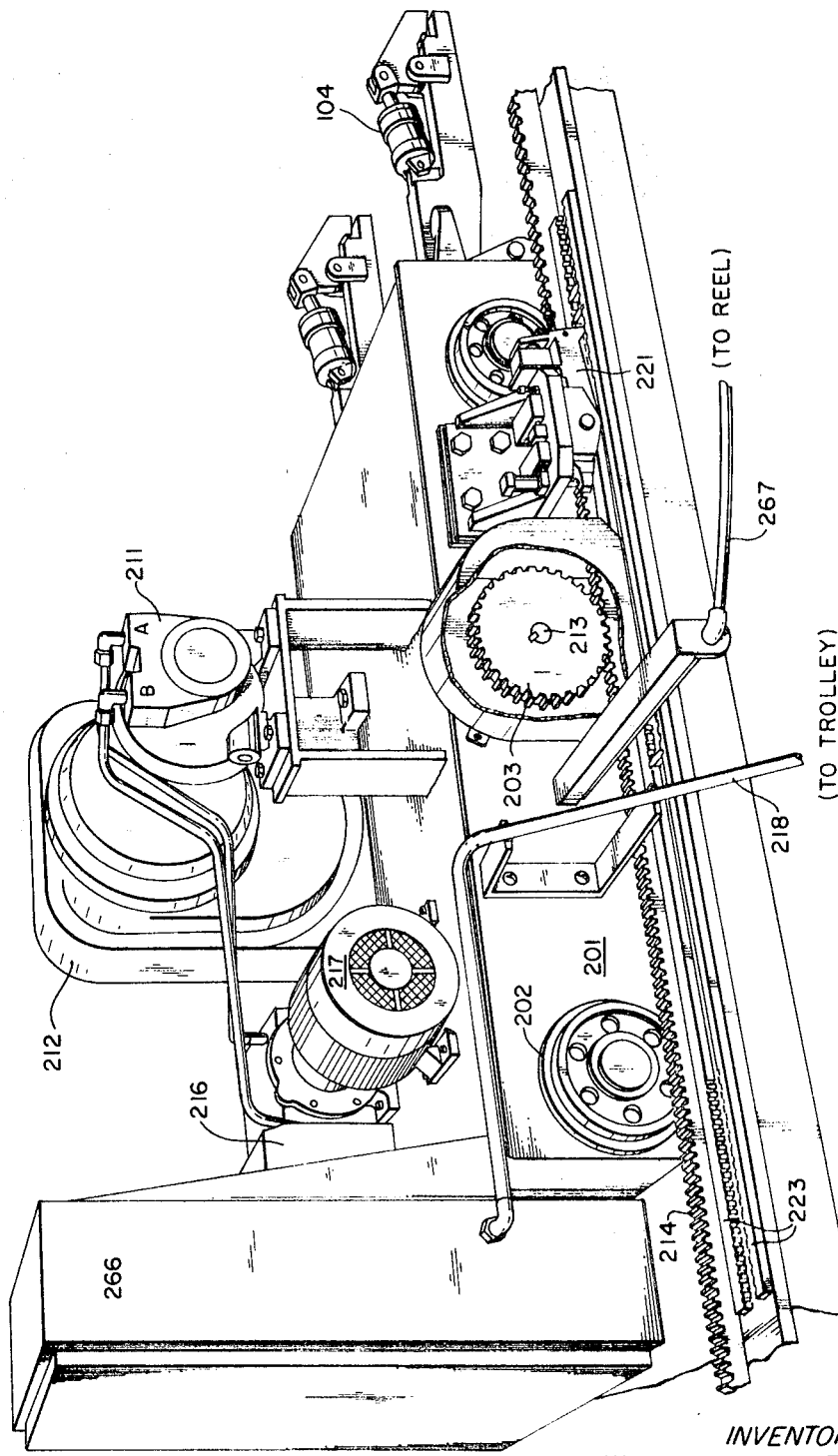

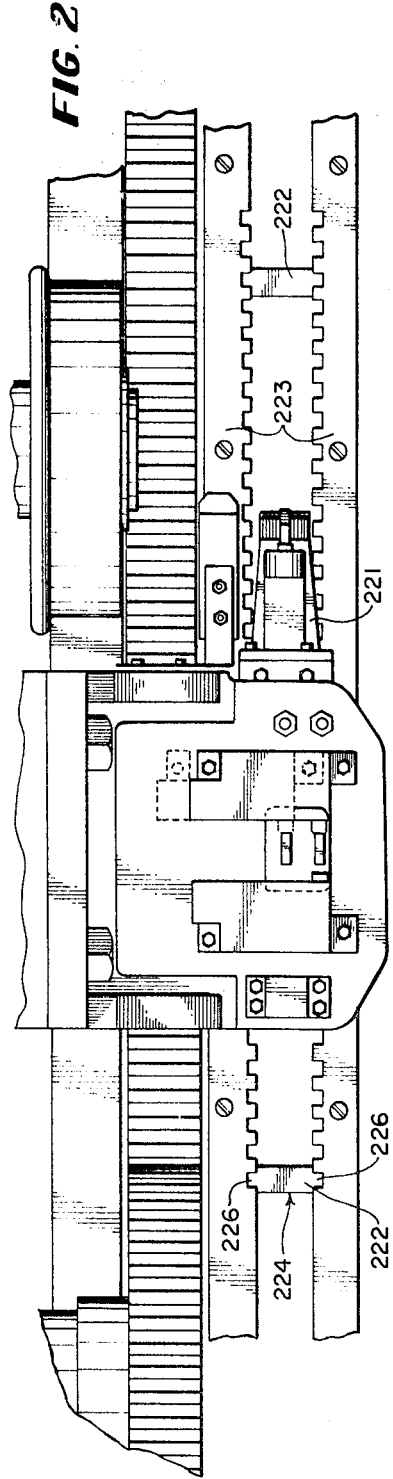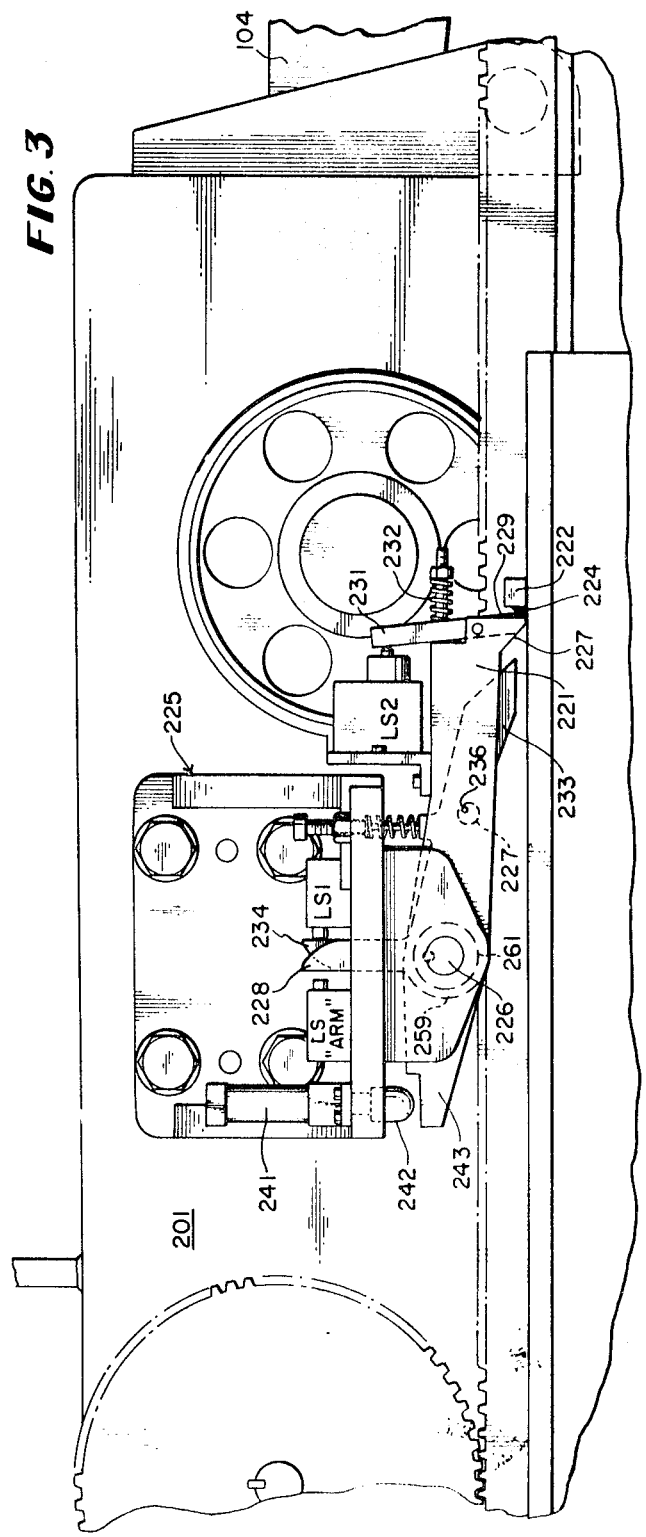

GAUGE STOP SYSTEM FOR MOVING WORK THROUGH PUNCH PRESS

INTRODUCTION

The invention, of which the present disclosure is offered for public dissemination in the event adequate patent protection is available, relates to equipment for aiding in the punching of holes in structural steel members such as I-beams and angle bars. More specifically, it relates to the automatic precise positioning of the workpieces as they are drawn through the punch press by a tow carriage.

A typical use of the present invention is in connection with the Beatty spacing table of U.S. Pat. No. 2,452,285, Oct. 26, 1938. That spacing table has been extremely successful and satisfactory in supporting steel I-beams and the like as they move through a punch press.

Throughout years of use of the Beatty spacing table and of other devices of similar purpose, one of the persistent problems has been the problem of stopping the longitudinal movement of the beam through the press with the necessary precision so that the holes would be punched at exactly the right position longitudinally of the workpiece.

Among the widely different methods which have been used, a type most attractive has been to position a series of stop members along the path of the carriage which is used for towing the workpieces through the press, and arranging to stop the carriage with a gauge member carried by it pressing against a stop member. This has been quite successful when manual power was used. There has also been some automatic operation of the carriage, with power drive of the carriage, but this has been somewhat disappointing partly because of the inherent susceptibility of deterioration of the gauge members. There was not only the deterioration actually experienced, but the need to avoid more severe deterioration by keeping overall speed excessively slow. Several factors contributing to this wear have been corrected by the present invention, and very satisfactory speed can be achieved.

According to the present invention, there is high-speed movement of the tow carriage for any moves that are of substantial length, but gauging is always relatively gentle. After each operation of the punch press, the carriage accelerates smoothly and at a chosen rate to its maximum speed. As the position for another punch operation is reached, the carriage is smoothly decelerated at a chosen rate while its gauge member, in the form of a pivoted arm, rides over the stop member. With the carriage moving at slow speed, the gauge arm drops beyond the stop and this dropping action triggers a reversal of the carriage so that at slow speed the carriage is moved to press the gauge arm against the stop. As these two members are coming into contact, a limit switch is tripped which reduces the reverse driving force to a value which cannot cause damage to the contacting gauge faces, and minimizes power consumption. Preferably, neither gauge face is ever subjected to any contact that is not relatively gentle and spread over a large flat face.

Additional objects and advantages of the invention will be apparent from the following description and from the drawings.

DESIGNATION OF FIGURES

FIG. 1 is a general view of perspective nature of a preferred embodiment of the present invention, seen mainly from the side, somewhat simplified for illustration.

FIGS. 2 and 3 are respectively plan and side elevational views of the gauging unit seen on a smaller scale in FIG. 1, conducts being omitted for clarity and some associated parts being shown.

BACKGROUND DESCRIPTION

Figure 5:
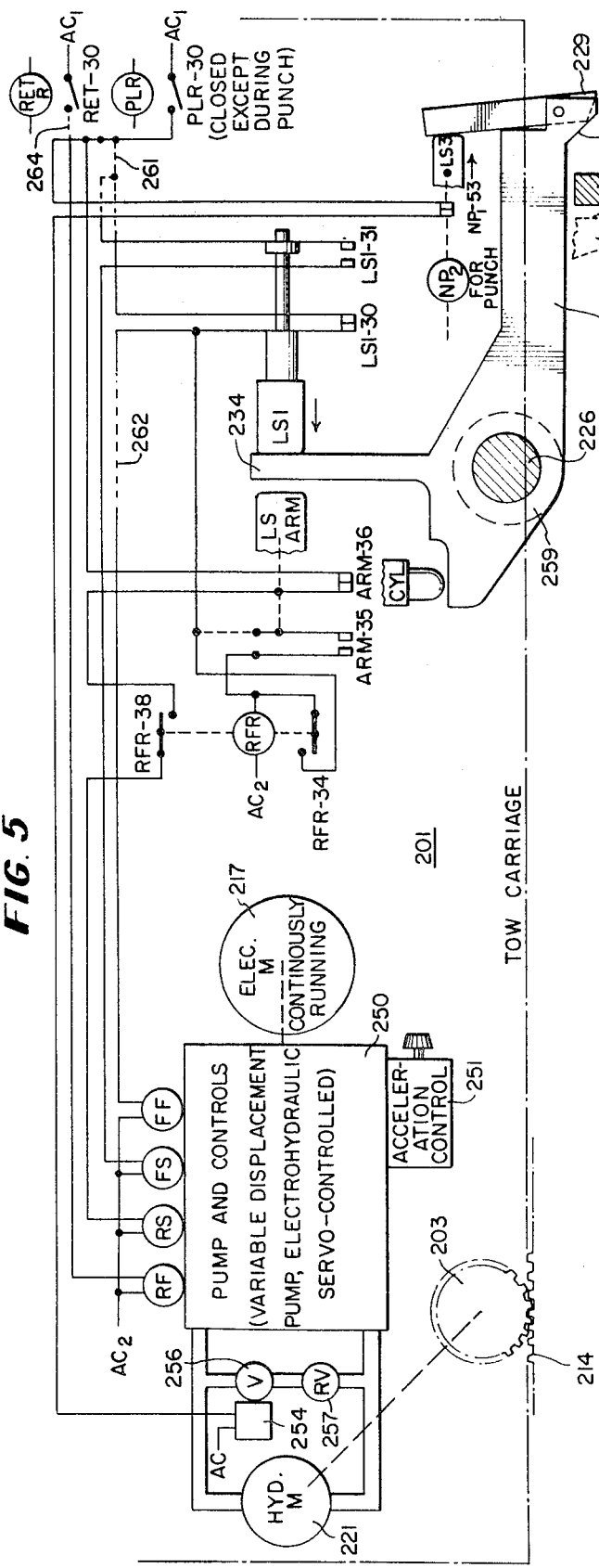
FIG. 5 is a diagram by which the functions of the invention and the main features of the circuitry and drive may be explained.

The following description starts with the number 201 to avoid confusion with numbers in a commercially prepared circuit diagram which will be in the Patent Office file of this patent, if not printed in the patent.

In some respects the present invention resembles prior practice. A carriage 201 equipped with wheels 202 running on a waist-high track is driven along the track by cog drives, each comprising spur gear 203 and rack 214. The carriage 201 is also provided with a set of hydraulic clamps 204, for which the hydraulic pressure is electrically controlled, to clamp the workpieces 206 and pull them through a punch press. The carriage must be carefully stopped at the proper positions for precise longitudinal positioning of the workpieces for punching.

The present invention is concerned especially with the means for achieving the accurate positioning of the workpieces when they are stopped for punching.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

CARRIAGE DRIVE

It is highly preferred for this invention that the carriage 201 be hydraulically driven because it lends itself to very smooth and flexible control. Accordingly a hydraulic drive motor 211 drives spur gear 203 through a speed-reducing gearbox 212. It should be mentioned that there is another spur gear 203 on the far side of the carriage, keyed to the same drive shaft 213. Each spur gear 203 engages its own rack 214.

Hydraulic motor 211 can be driven in either direction and have varying speeds by a hydraulic pump 216. Pump 216 is driven by electric motor 217. Preferably electric motor 217 runs constantly during periods of operation. It may be powered by wires extending through conduit 218 which leads to a trolley system extending along the path of carriage 201. The stationary trolley conductors along which the trolley contacts slide are of course guarded by a slotted by a safety cover.

The system for driving hydraulic motor 211 should provide at least two speeds forward and two speeds in reverse, with smooth transition between the two. Preferably the rate of speed change, acceleration or deceleration, is adjustable. This will be more fully explained in connection with FIG. 5.

Accurate positioning of the carriage 201 and the workpieces 206 clamped to its is achieved through cooperation of a pivoted gauge arm 221 and a plurality of stops or gauge bars 222. Each gauge bar is firmly held against movement in the direction of carriage travel by a pair of notched bars 223. As seen in FIG. 2, the gauge bars 222 may be provided in a small variety of shapes which, when turned one way or another, will give a large variety of precise locations of their gauge faces. In other words, their gauge faces 224 are located at varying spaces from the securing lugs 226.

GAUGE ARMS

As seen in FIG. 3, each gauge arm 221 is sturdily pivoted on a pin 226, has a camming face 227, and an upstanding switch actuator 228 pivoting with the arm 221. The camming face 227 is forwardly facing, i.e., in the direction of the carriage travels when moving the workpieces through the punch on its working run. This has been shown as the run in which the pieces are pulled, the pieces being pushed during the return run. As the carriage advances past a gauge bar 222, arm 221 will ride up over the gauge bar. As it reaches approximately the height of the gauge bar, it will trip limit switch "ARM," and as arm 221 falls off of gauge bar 222 when it has passed this gauge bar, actuator 228 will allow limit switch "ARM" to return. As will be explained in detail later, this return of limit switch "ARM" causes a reversal of carriage 201 so as to bring the gauge face 229 of arm 221 against the gauge face 224 of the gauge bar 222 which has been passed. As these two faces are just about to come into contact, the lower end of gauge bar sensor 231 will strike gauge bar 222. Because gauge bar sensor 231 is pivoted to arm 221, gauge bar 222 will swing it enough to release the plunger of limit switch "LS2," tripping the switch. The pivotal action of sensor 231 compresses a biasing spring 232, which will restore the sensor to its FIG. 3 position when, after completion of the punching operation, carriage 201 moves gauge arm 221 away from gauge bar 222.

The tripping of limit switch LS2 by removal of sensor 231 from it reduces the driving force by which carriage 201 is driven, so that there will be no damage to the gauge surfaces 229 and 224. This same release of the limit switch will also be used either to cause automatic operation of the punch or to signal an operator that the workpiece is in position ready for punching.

The gauge arm assembly 225 also includes an additional limit switch, LS1, which is necessary in order to prepare the circuitry for the action already described, as is explained later. This limit switch LS1 could be positioned to be activated by the actuator 228. For higher speed operation, however, earlier operation of limit switch LS1 is desired. Accordingly, an approach sensor 233 is provided, positioned ahead of camming surface 227. It is also pivoted about pin 226, and carries its own actuator 234. When sensor 233 begins to ride up on a gauge bar 222, it s actuator 234 moves away from limit switch LS1, allowing that switch to be tripped by internal spring action. When carriage 201 is moving at a high speed, this tripping of limit switch LS1 will cause reduction of the speed.

Once the approach sensor 233 has been raised by gauge bar 222, it will not drop again to press in the plunger of limit switch LS1 until the limit switch "ARM" has taken over control. The premature dropping of approach sensor 233 is prevented by a pin 236 carried by a gauge arm 221 and extending into an oversize aperture 227 in approach sensor 233, which will let the approach sensor move upwardly far enough to release limit switch LS1 but will not let it drop any lower, relative to gauge arm 221 than is seen in FIG. 3. Actually, approach sensor 233 cannot drop far enough to press the plunger of limit switch LS1 until the gauge arm 221 drops off of gauge bar 222, all of the gauge bars being wide enough to more than bridge from the trailing tip of approach sensor 233 to camming face 227.

RETURN RUN

Usually a bar which has been drawn through the punch press will need to be returned to its starting position either for another run, punching a different flange of the bar, or for disposal of the bar. In any event, carriage 201 must return to its starting position. So that gauge arms 221 will not strike gauge bars 222 during such return run, gauge arms 221 and approach sensor 233 are jointly raised by action of hydraulic cylinder 241. A plunger 242 is pressed downwardly by cylinder 241, when a solenoid supplies hydraulic fluid to cylinder 241. Plunger 242 then engages heel 243 of gauge arm 221 and pivots the gauge arm to raise its gauge and above the level of stop bars 222. The circuitry prevents the start of the return run until this action has taken place.

ADDITIONAL RUNS

Inasmuch as the second run of a given workpiece may require punching at different points than were required on the first run, all of the gauging parts described are preferably duplicated on the other side of the carriage. Thus an additional set of gauge bars 222 may be selectively positioned on that side to control the second run, in cooperation with another gauge arm 221, and a full complement of associated parts as in assembly 225. The circuitry is such that when the operator at a control console turns a selector switch to select run 1 or run 2, the circuit will be made effective as described for all of the controls for the selected assembly 225. As to the other assembly 225, the solenoid for supplying fluid to its cylinder 241 will be actuated, and all of the other controls will be made ineffective for the circuit as long as the selector switch remains as once set. The same selector switch may have a third position by which the operator chooses a return run, both of the cylinders 241 then being actuated to raise their gauge arms 221 and the circuit 3 being made ineffective as to all of the other switches of assembly 225.

Occasional users may want to be able to have three runs with different positionings for the workpieces. In that case, a third assembly 225, and a third pair of gauge bar holders 223 are provided. Of course, the circuitry will then raise two of the gauge bars 221, making the circuitry controlled only by the switches of the third.

KEY CIRCUITRY

The key circuitry by which the foregoing results are accomplished is shown in FIG. 5. Contacts that are operated by the limit switches are shown in physical form. When there is an intervening relay, a broken line from the limit switch plunger to the contacts is used. In the circuits, broken lines represent other controls which need not be explained in detail. They are shown in the commercially prepared circuit diagram mentioned and will be understood by anyone familiar with such circuitry, or could be supplied, with the aid of the explanation here given, by those skilled in the appropriate art. In this FIG., there has been considerable simplification, including the omission of the approach feeler 233. However, the number of its actuator 234 has been given to the face of actuator 228, namely that face of actuator 228 which is shown actuating limit switch LS1.

Gauge arm 221 is shown about to engage gauge bar 222 with camming face 227. Camming face 227 will raise gauge arm 221, swinging actuator face 234 away from limit switch LS1. This allows normally closed contacts LS1–30 to spring open, breaking the circuit to relay FF.

To the extent possible, the symbols here used correspond to the commercial circuit diagram already mentioned. The two pivots of "LS1–30" indicate respectively that the contacts are actuated by limit switch LS1 and that the contacts here shown are in line 30 of the circuit diagram.

Relay FF is the "forward fast" relay, the relay which closes the necessary circuits for driving hydraulic motor 221 in the forward direction at its higher speed.

The release of limit switch LS1 by actuator face 234 also closes contacts LS1–31. These contacts close a circuit to relay FS. This is the forward slow relay which closes the necessary contacts for supplying hydraulic fluid to motor 221 still in the forward direction but at slower speed, i.e., a lower volume of fluid. For illustrative purposes, and because it is one possible method of operation, it might be assumed that there are two pumps, one small pump for slow speed operation and one larger pump for fast operation, together with reversing valves for connecting either pump to hydraulic motor 221 with either direction of flow.

At the present time, however, it is preferred to use a single pump with variable and reversible flow, all controlled by shifting a single element, the speed of shifting being adjustable. A unit 251 has been illustrated as a control unit for adjusting the acceleration and deceleration.

Equipment of this type is readily available commercially as variable-displacement electrohydraulic servo-controlled pumps, and is explained in Bulletin 47740-A of the Oil Gear Company, Milwaukee, Wisconsin, U.S.A. Circuitry adaptations for the present invention are disclosed herein in the commercial drawings already mentioned.

Figure 4:
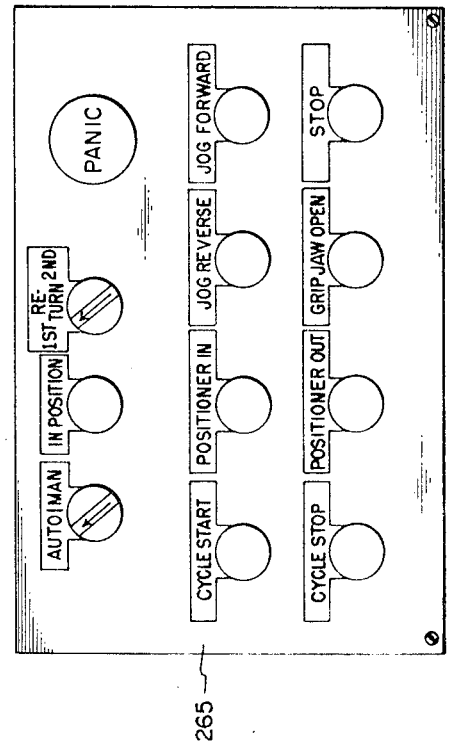
FIG. 4 is a face view of the control panel on a stationary console.

As can face 227 raises gauge arm 221 further, actuator 238 will trip the limit switch LS–ARM. In this instance the circuitry happens to include an intervening relay. However, actuation of this limit switch causes opening of contacts ARM–36 and closing of contacts ARM–35. Contacts ARM–35 energize relay RFR. This relay closes contacts RFR–34, which merely operate to hold relay RFR energized independently of contacts ARM–35. Relay RFR also closes contacts RFR–38 which are in the circuit to relay RS, the relay which will, eventually but not yet, produce reverse slow drive of hydraulic carriage drive motor 221. Relay RS is prevented from being actuated initially by the opening of contacts ARM–36 which are in series with the contacts RFR–38. However, when the carriage moves little further, now at slow speed, and gauge arm 227 drops off of gauge block 222, as indicated by the dotted line position of the tip of gauge arm 221 in FIG. 4, actuator 238 releases limit switch LS–ARM, and this closes contacts ARM–36, thereby completing the circuit to relay RS and actuating control means 250 to produce slow reverse drive of carriage 201. With the preferred pump and control described, there is a smooth transition with deceleration of the forward drive and acceleration of reverse drive to the slow speed volume of fluid. The rate of deceleration and acceleration is as controlled by unit 251, which can be adjusted depending upon the weight and hence the momentum of the workpieces being towed.

As carriage 201 moves slowly in reverse, its gauge bar 229 comes into contact with stop bar 229 and by it is pivoted so as to release limit switch LS2. This switch, through a relay, operates contacts $NP_1$ which interrupts the circuits to solenoid 254, thereby opening valve 256 so that oil supplied to pump 221 can be bypassed at a moderate pressure determined by relief valve 257 which is preferably adjustable. This moderate pressure determines the force with which gauge arm 221 will be held against stop 222 during the punching operation.

When valve 256 is closed so that relief valve 257 cannot function, the pressure supplied to motor 221 will still be subject to some predetermined limit, determined by another relief valve, as is conventional. This limit may be, for example, three times as high as a typical setting of valve 257. Of course, this high pressure will rarely be present in the lines supplying hydraulic motor 221, although it may be approached during acceleration. As gauge arm 221 comes into contact with gauge bar 222, the carriage will be largely coasting at slow speed and the pressure of oil to motor 221 required to maintain the coasting may be quite low, far lower than that to which it will rise, limited by valve 257, after further movement is prevented upon engagement of gauge arm 221 firmly against gauge bar 222. Because gauge bar 222 must check the momentum of the carriage and its load, even though this momentum is not very great at slow speed, the gauge bars, their mounting, gauge arm 221 and its mounting and all related parts must be quite sturdy. For example, as seen in FIG. 2, the sides of gauge arm 221 diverge in the direction approaching pin 226. Each side should be provided with a sturdy hub 259 elongate along the pin 226. The smaller hub 261, seen in FIG. 3, is the hub of actuator 234. It lies between the hubs 259 and does not need to be particularly sturdy. Pin 226 is of course firmly supported at both ends, closely adjacent to the sides of gauge arm 221.

Limit switch LS3 also controls through a relay, the relay $NP_2$ which can actuate a signal light on the control console and one or more functions at the punch press. For example, at the punch press there may be one or more clamps for assuring accurate lateral positioning of the workpiece before it is punched. The punch operation could proceed automatically, but it may be preferred to rely on the operator at the console to press a button actuating the punch, if there is no reason for delay.

During the operation of the punch press, relay PLR at the upper right corner of FIG. 5 is deenergized, opening its contact PLR–30. This deenergizes relay RFR, in spite of its holding contact RFR–34, and ends any other "hold" conditions set up during the cycle. When the punch has completed punching and is on its return stroke, it will actuate a limit switch to reenergize relay PLR closing contact 30 to start a new cycle, beginning with the energization of relay FF to effectuate forward fast speed drive of hydraulic motor 221. The broken lines at 261 and 262, in the energizing circuit for relay FF include respectively contacts which are held open while relays FS and RS are energized. These prevent further energization of the FF relay from the time contacts LS1–31 and LS1–30 are actuated by release of limit switch LS1 until a new cycle is begun, as just described, by the reclosing of contacts TLR–30.

RETURN DRIVE

An end travel limit switch position to be actuated by carriage 201 after the position for the last punching has been reached will terminate the cycling and stop the drive of carriage 201. The operator may switch the selector switch to its "return" position, or the turn relay RET (upper right of FIG. 5) may actuate contacts RET–30 in the circuits for rely RF to produce reverse fast drive of hydraulic motor 221, if the other control contacts in the circuit, represented by broken line 264 in FIG. 5 was closed. These other contacts include in series contacts closed by limit switch LS–ARM when the gauge arm 221 is safely raised (and additional contacts of like nature for each such other arm 221 which the carriage carries) and contacts which interrupt the circuit if relay FF is energized. This circuit will also be directly or indirectly interrupted at the end of the return stroke by another end travel limit switch. Thereupon nothing will occur until the operator intervenes. Unless the work has been completed, the operator will turn the selector switch to the proper run number, and (when the workpieces are properly positioned and clamped for the new run) press a "cycle start" button to begin the first cycle of a new run.

CIRCUIT CONNECTIONS, VARIATIONS

Although most of the circuit element described would be mounted in circuit box 266, some are external, chiefly in a console, represented by operator's control panel 265, adjacent to the punch press. Accordingly a cable 267 (FIG. 1) carries the necessary connections, the cable being automatically wound and paid out from a reel (not shown) and connected through electrical slip rings. As a matter of fact, the power may be supplied in like manner and even through the same cable and reel if properly designed and if governing safety codes permit.

Among many variations mention is made of the possibility of controlling a gauge arm to be held in its upper position except when a feeler determines that it should be lowered. In the illustrated form this would be a needless complication. It might be used if someone chose to use a vertically sliding gauge member instead of the pivoted gauge arm shown, although this would be regarded as inferior use of the invention.

ACHIEVEMENT

The invention described is believed to be more satisfactory than any of the previous forms of automatic precise stopping of the steel members for punching. Overall work time on a given steel member can usually be considerably reduced by running at high speed except for the minimum time provided for safe gauge stopping. It might seem that reversing each time would represent wasted time, but in fact it permits cutting to a minimum the time allowed for deceleration from high speed. There is no need to design in a supposedly "safe" margin inasmuch as it is virtually impossible for excessive coasting in the forward direction to do any damage. Even a sluggish relay (an eventuality which seems to be inevitable even if rare) causes no damage. The gauge arms would simply ride over the stop bar, and needlessly too far beyond it. Instead of stripping a gauge member or doing more serious damage, it merely necessitates an extra second or so in the reverse direction at slow speed to the gauging position. There is no need to provide easily sheared gauge stops to prevent serious damage. In fact, due to their ruggedness and the wide gauging areas that never rub, the gauge parts here can be expected to remain accurate for many years.

The holes to be punched can be at very short intervals longitudinally of the steel members being punched. In the version already discussed, it is only necessary that the gauge bars 222 be far enough apart to allow the tip of gauge arm 221 to drop between them. If a given purchaser expects to need closer spacing than this, the circuitry can be revised to allow both gauge arms 221, or all three, to function on the same run. In that event, two or even three stops could allow one another by a quarter of an inch or less, the two or three gauge arms functioning in succession on different rows of gauge bars 222.

We claim:

1. A drive-and-control system for a tow carriage used for moving structural pieces through a punch press and stopping the pieces at predetermined points determined by gauge bars, said carriage including a wheeled chassis for running on track and means at one end for securing a workpiece to the chassis, and including a rotary drive member for propelling the carriage;
   a hydraulic motor for driving the drive member, pump means and control means for driving the hydraulic motor forwardly at fast and slow speeds and rearwardly at fast and slow speeds;
   feeler means including a gauge arm pivoted on said chassis, trailing from its pivotal axis and shaped and positioned to cam over a gauge stop upon forward movement of the carriage, the gauge arm having a gauge face adapted to come against the gauge stop upon reverse movement of the chassis after the gauge arm has dropped on passing over a gauge stop;
   switch means responsive to movement of the feeler means controlled by a gauge stop predetermined distance before dropping of the gauge arm for causing the pump and control means to reduce the forward speed from fast to slow, and responsive to dropping of the gauge arm after passing a gauge stop for causing the pump-and-control means to reverse the drive to reverse slow speed;
   means for causing the supply of pressure fluid to the motor, at least when the gauge arm has engaged in gauge relation to the gauge stop, to be subject to relief at a predetermined moderate pressure suitable for holding the carriage with its gauge arm in gauge relation to the gauge stop for operation of the punch press; and
   means for responding to punch press operation to initiate a new cycle with forward fast drive by said pump-and-control means.

2. A drive-and-control system for a tow carriage used for moving structural pieces through a punch press and stopping the pieces at predetermined points determined by gauge bars, said carriage including a wheeled chassis for running on track and means at one end for securing a workpiece to the chassis, and including a rotary drive member for propelling the carriage;
   a hydraulic motor for driving the drive member, pump means and control means for driving the hydraulic motor forwardly at fast and slow speeds and rearwardly at fast and slow speeds;
   feeler and gauge means including a gauge member movable generally vertically on said chassis, positioned to be lowered after it has passed a gauge stop upon forward movement of the carriage, the gauge member having a gauge face adapted to come against the gauge stop upon reverse movement of the chassis after such lowering of the gauge member;
   switch means responsive to movement of the feeler means controlled by a gauge stop, a predetermined distance before dropping gauge member has passed that stop, for causing the pump-and-control means to reduce the forward speed from fast to slow, and responsive to passing of the gauge stop for causing the pump-and-control means to reverse the drive to reverse slow speed;
   means for causing the supply of pressure fluid to the motor at least when the gauge member has engaged in gauge relation to the gauge stop, to be subject to relief at a predetermined moderate pressure suitable for holding the carriage with its gauge member in gauge relation to the gauge stop for operation of the punch press; and
   means for responding to punch press operation to initiate a new cycle with forward fast drive by said pump-and-control means.

3. A drive-and-control system according to claim 2 including switch means responsive to movement of the gauge member into gauge relation with the gauge block for initiating a signal indicating readiness for the punch press to operate.

4. A drive-and-control system according to claim 2 in which a first switch is activated by the gauge member which is in lowered position, said switch being in circuitry which then tends to establish reverse-slow drive; and
   an additional switch for preventing this circuitry from thus functioning until after the gauge member has, upon approaching the gauge position, been raised to deactivate the first switch, the circuitry functioning thereafter when the gauge member lowers.

5. A drive-and-control system for a tow carriage used for moving structural pieces through a punch press and stopping the pieces at predetermined points determined by gauge bars, said carriage including a wheeled chassis for running on track and means at one end for securing a workpiece to the chassis and including a rotary drive member for propelling the carriage;
   a hydraulic motor for driving the drive member, pump means and control means for driving the hydraulic motor forwardly at fast and slow speeds and rearwardly at fast and slow speeds;
   feeler and gauge means including a gauge member movable generally vertically on said chassis, positioned to be lowered after it has passed a gauge stop upon forward movement of the carriage, the gauge member having a gauge face adapted to come against the gauge stop upon reverse movement of the chassis after such lowering of the gauge member;
   switch means responsive to movement of the feeler means controlled by a gauge stop, a predetermined distance before dropping gauge member has passed that stop, for causing the pump-and-control means to reduce the forward speed from fast to slow, and responsive to passing of the gauge stop for causing the pump-and-control means to reverse the drive to reverse slow speed;
   means for causing the supply of pressure fluid to the motor, at least when the gauge member has engaged in gauge relation to the gauge stop, to be subject to relief at a predetermined moderate pressure suitable for holding the carriage with its gauge member in gauge relation to the gauge stop for operation of the punch press; and
   means for responding to punch press operation to initiate a new cycle with forward fast drive by said pump-and-control means;
   said gauge stop and gauge member being sturdy for reliably halting reverse-slow movement, and having large gauge contact faces with only nonwiping contact between them to remain accurate through years of service.

6. A drive-and-control system for a tow carriage used for moving structural pieces through a punch press and stopping the pieces at predetermined points determined by gauge bars, said carriage including a wheeled chassis for running on track and means at one end for securing a workpiece to the chassis, and including a rotary drive member for propelling the carriage;
   a hydraulic motor for driving the drive member, pump means and control means for driving the hydraulic motor forwardly at fast and slow speeds and rearwardly at fast and slow speeds;
   feeler means including a gauge arm pivoted on said chassis, trailing from its pivotal axis and shaped and positioned to cam over a gauge stop upon forward movement of the carriage, the gauge arm having a gauge face adapted to come against the gauge stop upon reverse movement of the chassis after the gauge arm has dropped on passing over a gauge stop;

switch means responsive to movement of the feeler means controlled by a gauge stop a predetermined distance before dropping of the gauge arm for causing the pump-and-control means to reduce the forward speed from fast to slow, and responsive to dropping of the gauge arm after passing a gauge stop for causing the pump-and-control means to reverse the drive to reverse slow speed;

means for causing the supply of pressure fluid to the motor, at least when the gauge arm has engaged in gauge relation to the gauge stop, to be subject to relief at a predetermined moderate pressure suitable for holding the carriage with its gauge arm in gauge relation to the gauge stop for operation of the punch press;

said gauge stop and gauge member being sturdy for reliably halting reverse-slow movement, and having large gauge contact faces with only nonwiping contact between them to remain accurate through years of service.

7. A drive-and-control system for a tow carriage used for moving structural pieces through a punch press and stopping the pieces at predetermined points determined by gauge bars, said carriage including a wheeled chassis for running on track and means at one end for securing a workpiece to the chassis, and including a rotary drive member for propelling the carriage;

a hydraulic motor for driving the drive member, pump means and control means for driving the hydraulic motor forwardly at fast and slow speeds and rearwardly at fast and slow speeds;

feeler and gauge means including a gauge member movable generally vertically on said chassis, positioned to be lowered when it has passed a gauge stop upon forward movement of the carriage, the gauge member having a gauge face adapted to come against the gauge stop upon reverse movement of the chassis after such lowering of the gauge member;

switch means responsive to movement of the feeler means controlled by a gauge stop a predetermined distance before dropping of the gauge member has passed that stop for causing the pump and control means to reduce the forward speed from fast to slow, and responsive to passing of the gauge arm beyond a gauge stop for causing the pump-and-control means to reverse the drive to reverse slow speed;

switch means responsive to movement of the gauge member into gauge relation with the gauge stop for initiating a signal indicating readiness for the punch press to operate, and for effectuating a reduced pressure relief condition affecting the supply of pressure fluid to the motor for holding the carriage with its gauge member in gauge relation to the gauge stop with reduced force as compared to the force available for driving the carriage; and means for responding to punch press operation to initiate a new cycle with forward fast drive by said pump-and-control means.

8. A drive-and-control system for a tow carriage used for moving structural pieces through a punch press and stopping the pieces at predetermined points determined by gauge bars, said carriage including a wheeled chassis for running on track and means at one end for securing a workpiece to the chassis, and including a rotary drive member for propelling the carriage;

a hydraulic motor for driving the drive member, pump means and control means for driving the hydraulic motor forwardly at fast and slow speeds and rearwardly at fast and slow speeds;

detector and gauge means including a gauge member movable generally vertically on said chassis and cammed upwardly by a gauge stop, for causing the pump-and-control means to reduce the forward speed from fast to slow, and responsive to the dropping of the gauge member for causing the pump-and-control means to reverse the drive to reverse slow speed;

means for causing the supply of pressure fluid to the motor, at least when the gauge member has engaged in gauge relation to the gauge stop, to be subject to relief at a predetermined moderate pressure suitable for holding the carriage with its gauge member in gauge relation to the gauge stop for operation of the punch press; and means for responding to punch press operation to initiate a new cycle with forward fast drive by said pump-and-control means.

9. A drive-and-control system according to claim 8 in which the switch means includes a contact which must be closed to effectuate reverse-slow drive and which is opened and closed by rise and fall of the gauge member, and holding switch means which must also be closed to effectuate reverse-slow drive and which is closed in response to the rise of the gauge member after it opens its said contact; and means for terminating the hold condition thereof to start a new cycle.

10. A drive-and-control system for a tow carriage used for moving structural pieces through a punch press and stopping the pieces at predetermined points determined by gauge bars, said carriage including a wheeled chassis for running on track and means at one end for securing a workpiece to the chassis, and including a rotary drive member for propelling the carriage;

a hydraulic motor for driving the drive member, a variable-displacement pump and electrohydraulic servo means controlling the pump with controlled speed of change for driving the hydraulic motor forwardly at fast and slow speeds and rearwardly at fast and slow speeds;

detector and gauge means including a gauge member movable generally vertically on said chassis, positioned to be lowered after it has passed a gauge stop upon forward movement of the carriage, the gauge member having a gauge face adapted to come against the gauge stop upon reverse movement of the chassis after such lowering of the gauge member;

switch means responsive to movement of the detector means controlled by a gauge stop, a predetermined distance before the gage member has passed a gauge stop, for causing the control means to reduce the forward speed from fast to slow, and responsive to passing of the gauge stop for causing the control means to reverse the drive to reverse slow speed;

means for causing the supply of pressure fluid to the motor, at least when the gauge member has engaged in gauge relation to the gauge stop, to be subject to relief at a predetermined moderate pressure suitable for holding the carriage with its gauge member in gauge relation to the gauge stop for operation of the punch press; and means for responding to punch press operation to initiate a new cycle with forward fast drive by said pump-and-control means.

11. A drive-and-control system according to claim 10 in which the control means includes means for readily adjusting its speed of change.

UNITED STATES PATENT OFFICE
CERTIFICATE OF CORRECTION

Patent No. 3,611,858      Dated October 12, 1971

Inventor(s) William C. Beatty and Milton G. Mock

It is certified that error appears in the above-identified patent and that said Letters Patent are hereby corrected as shown below:

Abstract, line 5, "two" should be -- tow -- .
Column 1, line 34, after "susceptibility", "of" should be -- to -- .
Column 1, line 69, "conducts" should be -- conduits -- .
Column 2, line 48, strike "by a" before "safety cover".
Column 2, line 55, "its" should be -- it -- .
Column 2, line 70, strike "of" after "direction".
Column 5, line 1, "can" should be -- cam -- .
Column 5, line 30, "$NP_1$" should be -- $NP_1$-53 -- .
Column 6, line 18, for the word "turn" substitute -- return may be effectuated automatically. In either event a return -- .
Column 6, line 19, "rely" should be -- relay -- .
Column 6, line 22, "was" should be -- are -- .
Column 6, line 38, "element" should be plural.
Column 7, line 12, "allow" should be -- follow -- .
Column 7, line 36, insert -- a -- after "stop".
Column 10, line 50, "gage" should be -- gauge -- .

Signed and sealed this 23rd day of May 1972.

(SEAL)
Attest:

EDWARD M. FLETCHER, JR.
Attesting Officer

ROBERT GOTTSCHALK
Commissioner of Patents